May 19, 1964     M. W. MARIEN     3,133,341
METHOD OF BANDING PISTON RINGS
Filed April 25, 1961
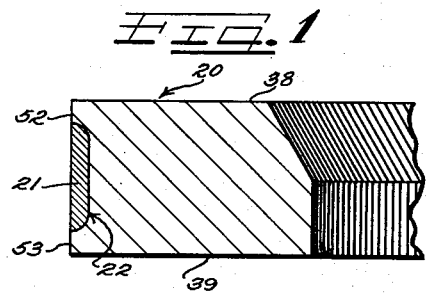
FIG. 1
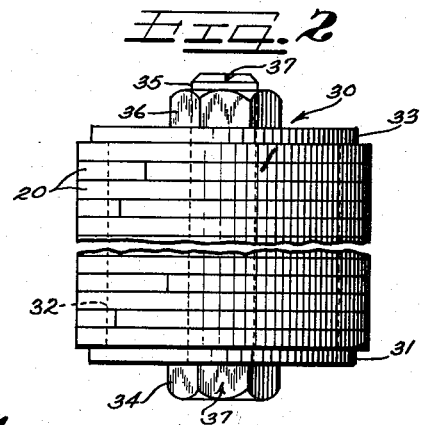
FIG. 2
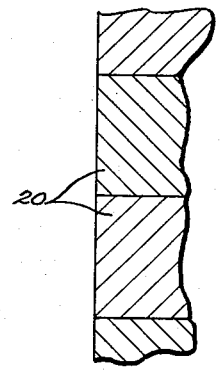
FIG. 3
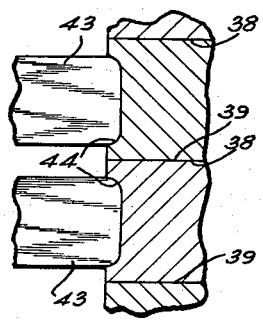
FIG. 4
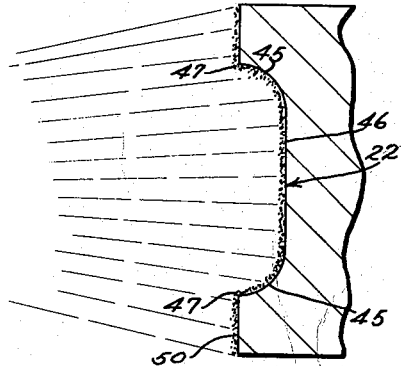
FIG. 6
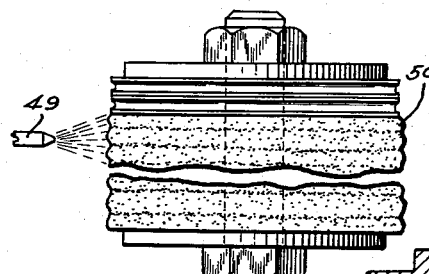
FIG. 5
FIG. 5a
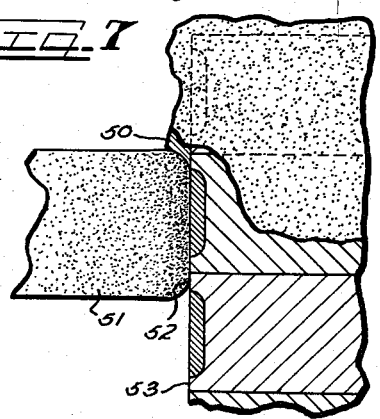
FIG. 7
INVENTOR.
MELVIN W. MARIEN
BY
ATTORNEYS 3,133,341
METHOD OF BANDING PISTON RINGS
Melvin W. Marien, Brentwood, Mo., assignor to Ramsey Corporation, St. Louis, Mo., a corporation of Ohio
Filed Apr. 25, 1961, Ser. No. 105,381
6 Claims. (Cl. 29—156.63)

The present invention is directed to the manufacture of piston rings for internal combustion engines, and is more particularly directed to a new and improved method of manufacturing cast iron compression rings with circumferential porous and wear resistant metal bands formed therearound.

This application is a continuation-in-part of my copending application entitled "Piston Ring and Method of Making Same," Serial No. 34,239, filed June 6, 1960.

As explained in the aforesaid patent application piston rings, whether of the compression or oil type, are exposed to substantial wear in use due to contact with the cylinder wall, as well as with the side walls of the ring grooves of the piston. In order to reduce piston ring wear, chromium has been, in the past, coated on the ring bearing surfaces but the high cost of producing chromium plated piston rings has limited the use of such rings. Still further, chromium coatings have been found to be relatively dense and therefore have oil retention properties which are not entirely satisfactory.

In order to obviate the disadvantageous characteristics of chromium plated piston rings while still providing rings which are characterized by superior resistance to abrasive and erosive wear and good oil retention properties, means have been devised for coating the flat bearing surfaces thereof with a porous wear resistant metal or metallic compound. It has been found that porous, wear resistant metal or metal oxide coated piston rings have a substantially increased life since they are characterized by a marked increase in resistance to abrasive and/or erosive wear, and a relatively low coefficient of friction. It has further been found that a substantial improvement in ring life and in the engine break-in is obtained due to the porosity and thus the oil retention characteristics of such coated rings.

The term "metal" as used herein with reference to the porous wear resistant material for coating the bearing face of the piston rings of this invention will include metallic compounds such as metal oxides.

However, while a hard metal bearing surfaec is advantageous from the standpoint of resistance to abrasive and/or erosive wear, it does not mate with the cylinder walls as readily as the usual materials used in the manufacture of piston rings such, for instance, as cast iron. It has been felt therefore that the provision of a piston ring having the combined advantageous characteristics of hard and ferrous metals would be desirable. Thus, banding of various types of piston rings of ferrous composition (such as the various irons and steels which may or may not have been nitrited) with a porous wear resistant metal is within the purview of this invention.

The method of the present invention now provides a cast iron compression ring which does combine the advantageous characteristics of wear resistant and ferrous metals and which employs the different metals to best advantage. While many wear resistant metals might be used to band ferrous metal rings, I have found that molybdenum and aluminum trioxide are particularly adapted for such use since they also possess quite good oil retention characteristics when they have been spray deposited on the rings.

The piston rings produced by the method of the present invention have a circumferential groove formed therein which is filled with a wear resistant metal having good oil retention characteristics. Because molybdenum and aluminum trioxide can be sprayed deposited to form a porous oil retaining band, these materials are preferred though the method of this invention is not limited to the use of these materials. The wear resisting metal is bonded to the ring and its outer surfaces lies in the surface of revolution common to the outer bearing surface of the ring so that it comprises a circumferential hard metal band. By forming a piston ring in this manner, the upper and lower portions of the ring bearing surfaces may be formed of ferrous metal or some other suitable "soft" metal so that the cylinder-wall-mating properties of these softer metals may be employed to best advantage at the edges of the ring bearing faces.

Piston rings which are stacked congruently and then have their entire bearing surfaces coated with hard metals in the finished state, are not readily separable after the finishing operation. However, in accordance with my invention, the outer surfaces of the congruently stacked piston rings are grooved prior to deposition of the wear resisting metal coating and are thereafter ground or otherwise conveniently diametrically reduced to slightly less than their original diameter, so that the wear resisting metal coating interconnecting the stacked rings is removed; leaving each ring with a groove filled with the wear resisting metal.

It is preferred that the wear resisting metal be applied by a spraying process subsequent to the grooving operation rather than by a plating process since the former substantially increases the porosity and hence the oil retention properties of the deposited metal. In this connection, a particularly important feature of my invention lies in the manner in which the piston rings are grooved and in which the wear resistant metal is applied to the grooves.

I have discovered, through experimentation, that it is particularly difficult to satisfactorily bond a wear resistant metal such as molybdenum or aluminum trioxide to all of the surfaces of a square-cut groove. In particular, I have discovered that an imperfect metal to metal bond may be formed along those surfaces of the ring grooves which are substantially parallel to the direction of flow of the metal spray. For instance, if atomized molybdenum is sprayed directly into a square-cut groove, the atomized molybdenum spray will not generally be impinged upon the side walls of the groove and even though sufficient molybdenum is sprayed into the groove to entirely fill the groove, my experiments have shown that an imperfect bond will often be formed between the molybdenum and the side walls of the groove. This imperfect bond may be caused by a slight imperfection in the configuration of the groove walls causing a portion thereof to overhang the interior of the groove and thus creating a slight air gap between the molybdenum and the side walls of grooves or may result in a finished product in which the molybdenum engages but is not actually bonded to the side walls of the groove.

Since the bands formed within the grooves in the cylinder wall engaging faces of piston rings may be subjected to substantial strains, it is of the utmost importance that the groove wall engaging surfaces of the wear resistant metal band be completely bonded to those groove surfaces.

To obviate the inherent disadvantages in the methods previously employed in attempting to bond a first metal to the walls of a square-cut groove formed within a second metal, I form the grooves with curvilinear corner portions which diverge from the base wall of the groove all the way to the lip thereof. That is, grooves formed in accordance with my invention may be characterized as having a cross-sectionally dish-like configuration; such a configuration being characterized by the fact that the side walls of the groove diverge outwardly from the base thereof. As a result, when the groove is sprayed with molybdenum or the like, atomized particles of molybdenum are directly impinged on all surfaces of the groove and, as a result, each surface of the groove becomes intimately bonded with the molybdenum.

Spray deposited metals are generally applied to piston ring surfaces under substantial pressures and the force of impingement of the atomized metal particles on the metal surfaces assures that an intimate bond will be made between the two metals. Of course, any method whereby an atomized wear resistant metal coating is directly impinged upon all of the surfaces of a groove to establish an intimate contact with the surfaces of the groove, is within the purview of my invention. Accordingly, in some limited applications it might be found desirable to arrange the spray gun so that it could be moved about to assure a direct impingement of the wear resistant metal on the groove surfaces. It is pointed out however that the method of establishing an intimate bond which has already been discussed (whereby the groove is formed with outwardly opening curved corner portions) is preferable, not only from the standpoint of production but also for the reason that the process first described will better assure that the metal spray will be directly impinged on every surface of the groove and that it will be more uniformly applied.

It is therefore a principal object of the present invention to provide an improved method for applying a wear resistant metal band to the bearing surface of a piston ring.

A more specific object of the invention resides in the provision of a method of banding piston rings whereby grooves having outwardly opening curvilinear corner portions diverging from the groove face to the lip thereof are formed within bearing surfaces of the piston rings and wherein a wear resistant metal is thereafter spray deposited within the grooves.

Yet another object of this invention lies in the provision of a method of expeditiously and inexpensively manufacturing in quantity piston rings of the type set forth above.

These and other objects of the invention will become apparent from time to time as the following specification proceeds and with reference to the accompanying drawings, wherein:

FIGURE 1 is a fragmental vertical sectional view through an ordinary flat faced piston ring formed in accordance with the principles of the present invention;

FIGURE 2 illustrates an arbor mounting arrangement for grooving and spraying the piston rings;

FIGURE 3 fragmentarily illustrates a plurality of piston rings prior to grooving;

FIGURE 4 illustrates the piston ring grooving operation;

FIGURE 5 illustrates another step in the formation of a piston ring constructed in accordance with my invention during which the wear resistant metal coating is spray deposited on the cylinder contacting faces of the rings and in the grooves formed within those faces of the rings;

FIGURE 5a is a diagrammatic vertical sectional view of a spray gun adapted to effect a metalizing operation;

FIGURE 6 is a fragmentary vertical sectional view of a single piston ring which illustrates the deposition of atomized metal on the bearing face and within the groove of a piston ring; and FIGURE 7 illustrates the grinding or finishing operation.

FIGURE 1 illustrates a standard flat faced cast iron compression ring 20 having a porous, wear resistant metal band 21 formed within a circumferential groove 22. The ring may then be so mounted on a piston that the ferrous metal portion of the ring will engage the cylinder wall during the early stages of its use so that the ring will readily mate with the cylinder wall. When the ferrous metal portion of the ring has worn slightly, the porous, wear resistant metal band will constitute the ring bearing face and will effectively resist wear.

In accordance with my invention, a plurality of banded piston rings maybe very inexpensively mass produced with particularly good results by following the steps illustrated in FIGURES 2 through 7. A plurality of flat bearing-faced piston rings of the type illustrated in FIGURE 1 are disposed in stacked or racked relationship upon an arbor generally indicated by numeral 30 in FIGURE 2. The arbor comprises in general a collar 31 at the lower end thereof which is integral with a reduced diameter mandrel 32 and a cap 33 disposed at the upper end of the arbor and bearing against the piston rings 20. The head 34 of a bolt 35 provides a bottoming surface for the collar 31 and has a nut 36 threaded thereon at its opposite end which may be tightened down against the cap 33 to maintain the piston rings 20 firmly in proper position between the collar 31 and the cap 33. The rings may, in fact, be so tightly secured together that none of the after applied wear resistant metal spray will seep between the side faces of adjacent rings.

The bolt head 34 and the opposite end of the bolt are grooved as at 37 to facilitate mounting of the arbor 30 upon suitable drive means so that the arbor may be rotated during the formation of the piston rings.

After the rings have been arbor mounted with their cylinder wall engaging surfaces in a common surface of revolution, the rings are grooved. In the illustrated embodiment of the invention, the rings are circumferentially grooved, though it may be found desirable to form grooves extending through only a portion of the circumference of the rings. Many means may be employed to effect this grooving operation but a preferred method lies in the provision of tool bits mounted in a tool block which may be aligned with the several piston rings. As illustrated in FIGURE 4, the tool bits 43 are centrally positioned with respect to the top and bottom surfaces 38 and 39, respectively, of each piston ring 20 and have a width corresponding to the desired width of the grooves 22. Thus, by feeding in the tool block and simultaneously rotating the arbor 30, all of the arbor mounted piston rings 20 may be simultaneously circumferentially grooved.

It is important to note that the bits 43 have rounded corners 44 so that the groove 22 formed by each of the bits will have outwardly opening curvilinear corner portions 45 diverging all the way from the base 46 of each groove to the lip 47 thereof and consequently to the bearing face of the ring. By controlling the grooving operations so that the bits 43 are fed into the rings 20 a distance not greater than the radius of curvature of the rounded corner portions 44 of the bits, the accidental formation of an overhanging side wall portion of the groove can be positively prevented.

Of course, while the above described grooving process is the preferred method of preparing the piston rings to receive an atomized metal spray, the rings might be provided with grooves having straight side walls diverging from the base thereof to the bearing face of the rings. In any event, rings formed in accordance with the principles of this invention are preferably formed with grooves having their entire surfaces opening outwardly of the groove so that sprayed metal particles travelling in a direction normal to the base 46 of each groove 22 will be directly impinged upon every surface of the groove. All such methods of grooving the piston rings are within the purview of invention.

The next step in my process is the application of a wear resistant metal to the exposed surfaces of the piston rings 20. A spray nozzle 49 is preferably used for this purpose, and while many units are satisfactory, commercially available spraying equipment offered for sale by the Metalizing Engineering Company, Inc., of Long Island, New York, has provided satisfactory results in practice. Such spraying equipment comprises in general, a mechanism for providing a controlled flow of compressed air, a mechanism for providing a controlled flow of acetylene or propane and oxygen, a spray gun, and a device for feeding a metal wire into the gun at a controlled rate.

For purposes of explanation, but not by way of limitation, molybdenum is hereafter referred to as being used to coat the grooved rings and as constituting the wear resistant metal.

Molybdenum is preferably supplied to the spray gun in the form of a wire 48, and such a wire material having good characteristics is that identified as "Spray Bond Wire" by its manufacturer, Metalizing Engineering Company, Inc.

Metal spraying by such an apparatus is a process whereby a metal such as molybdenum in the form of the wire 48 is drawn through a spray gun into a nozzle, such as the nozzle 49, where it is melted in an oxygen-gas flame and is thereafter atomized by the compressed air flowing around the melted end of the wire and through the nozzle 49. As shown in FIGURE 5a the nozzle 49 has inner and outer concentric converging passages 49a and 49b formed therein which carry combustible gases and air, respectively. By such apparatus an oxy-acetylene flame cone can be formed around the outer end of the molybdenum wire of sufficient heat to melt the wire. The melted molybdenum is thereafter atomized by the blast of compressed air issuing from the passage 49b and flowing around the melted end of the wire. The atomized spray of minute metal particles is then directed to the surface to be coated by the metal. Under some circumstances, such as where highly polished metals are to be coated, it may also be desirable to prepare the surface to be coated with a "preparation coating" specifically designed to provide an intimate bond between the surface to be coated and the metal coating substance. If necessary, such a "preparation coating" may also be sprayed on the rings in the manner hereafter described and the principles of my invention are equally applicable whether such a "preparation coating" is applied to the rings or not.

"Spray Bond Wire" is essentially pure molybdenum, and when heated to around 1,400° F. gives off a readily visible "smoke" which is the condensate of the common oxide of molybdenum ($MoO_3$). Although the metal melting point of molybdenum is 4,750° F. its principal oxide is given off as a vapor at 1,400° F. and apparently most of the oxide is in a vapor phase when the metal strikes the surface to be coated. This permits clean and uncombined metal to establish an intimate contact with the surface upon which it is impinged. It would appear that as a result, there is formed between the surface or base being coated and the molybdenum metal, an alloy of superior bonding characteristics.

The molybdenum coating may be applied by a stationarily mounted spray gun having a nozzle 49 while the arbor 30 is rotated at a desired rate of speed until the exposed surfaces of the arbor mounted rings have been coated with molybdenum to a desired thickness of approximately 0.007 inch or less. The applied molybdenum coating is indicated at 50 in FIGURES 5, 6 and 7.

For purposes of illustration, arbor mounted rings having a diameter of 4.0 inches may be grooved to a depth of 0.003 to 0.007 inch with a radius of curvature for the curvilinear corner portions of 0.003 to 0.007 inch, respectively. Preferably, a ring having a thickness of 0.070 inch will have a groove formed in the bearing face thereof having a width of 0.048 to 0.050 inch, leaving ferrous metal bearing faces of approximately 0.010 inch above and below the groove. Again by way of illustration, the air, oxygen, and acetylene gas pressures may be determined by settings of 32, 22 and 22, as indicated on flow meters provided therefore by Metalizing Engineering Company, Inc. and 15 gauge molybdenum wire may be fed into the spray gun at a rate of 1.5 to 2.0 feet per minute. Under such conditions, the arbor may be rotated at speeds of from 100 to 300 r.p.m. and the nozzle of the spray gun may be traversed across the arbor from one end to the other at a rate of 0.004 to 0.015 inch per arbor revolution and spaced a distance of from 2½ to 3½ inches from the adjacent surfaces of the arbor mounted rings.

I have found that by utilizing the procedure set forth above an intimate bond will be formed between the molybdenum and every exposed surface of the rings. It will be understood that the spray gun might be stationarily mounted and that the arbor could be moved in front of the gun. It should also be noted that I have found that the optimum spacing of the spray gun nozzle from the adjacent surfaces of the arbor mounted rings is approximately 3 inches but that coatings applied by guns spaced distances of from 2½ to 3½ from the workpiece will be satisfactory.

As heretofore noted, other materials such as aluminum trioxide may be substituted for the molybdenum and applied by a spray gun to the exposed surfaces of the rings. For purposes of indicating the type of materials which might be used as substitutes for molybdenum, it is here noted that molybdenum has a hardness of approximately 360 as registered on the Vickers scale with a porosity, when sprayed, in the range of 10% to 16%.

Subsequent to the above described steps, the rings may be finished by a single grinding operation. Referring to FIGURE 7, it will be noted that by traversing a grinding wheel 51 across the exposed surfaces of the arbor mounted piston rings 20, and by simultaneously rotating the arbor 30, the surplus solidified molybdenum will be removed from the rings to produce a finished ring of the type illustrated in FIGURE 1. It will be understood that the surfaces of the piston rings 20 are ground down to such an extend that the upper and lower bearing surfaces 52 and 53, respectively, of the rings 20 have no molybdenum coating thereon. That is, the rings are diametrically reduced by grinding to less than their original diameter.

The result is a finished piston ring of the type illustrated in FIGURE 1 having top and bottom bearing faces 52 and 53 formed of the same material as the body of the piston ring (cast iron for instance) and having a circumferential band 21 of hard, porous molybdenum intimately bonded with all of the surfaces of the ring groove. The surfaces of the band 21 and the bearing surfaces 52 and 53 are thus disposed in a common surface of revolution. These piston rings obviate the disadvantageous characteristics of prior types of chromium plated piston rings, and the like, since they are much less expensive to produce but are, nonetheless, characterized by superior resistance to abrasive and/or erosive wear and are further characterized by excellent oil retention characteristics.

In order to prevent corrosion of the finished ring, manganese phosphate may be sprayed thereover. This protective coating will not adhere to the molybdenum but will prevent corrosion of the ring body. Such a procedure is not a necessary step in the formation of the ring, but may be desirable in instances in which the ring is to be stored for long periods of time.

Still further, while the piston ring which is formed in the foregoing manner has the advantageous characteristics of a molybdenum ring, the upper and lower bearing surfaces 52 and 53 of the ring may be formed of relatively soft cast iron so that the rings will readily mate with the cylinder walls.

It should be obvious from the foregoing description of my invention that the method of spray depositing a metal within a groove formed in a second metal might have application in connection with much different structures than piston rings and that my invention discloses a means whereby a spray deposited metal may be intimately bonded to the surfaces of the groove of a second metal. My invention however, has particular application to a method of forming wear resistant banded piston rings and has thus been described in connection with such use.

It will therefore be understood that the illustrated embodiment of my invention has been used for illustrative purposes only and that various modifications and variations of the present invention may be effected without departing from the spirit and scope of the novel concepts thereof.

I claim as my invention:

1. A method of applying a porous wear resistant metal band to a ferrous metal piston ring which comprises forming a cross-sectionally dish-like groove within a bearing face of said ring with the side walls of the groove diverging all the way from the groove bottom to the bearing face of the ring, directing a fixed spray stream at the bottom of the groove substantially transverse to the axis of the piston ring, spray depositing from said stream within said groove in direct impinging engagement with every surface of said groove, a metal selected from the group consisting of molybdenum and aluminum trioxide, and effecting relative rotation between said spray stream and said groove to effect an intimate bond of the spray deposited metal with the ferrous metal about the entire ring.

2. A method of applying a porous metal band to a ferrous metal piston ring which comprises forming a cross-sectionally dish-like groove within a bearing face of said ring with the side walls of said groove diverging all the way from the groove bottom to the bearing face of the ring, spray depositing from a spray stream substantially transverse to the axis of the piston ring a metal selected from the group consisting of molybdenum and aluminum trioxide on said bearing face of the ring into direct impinging engagement with every surface of the groove and bearing face of the ring, effecting relative rotation between the spray stream and the ring to effect an intimate bond of the spray deposited metal with the ferrous metal and to fill the groove and cover said bearing face with said spray deposited metal about the entire ring, and removing said spray deposited metal to a depth exposing the ferrous surface of said ring on each side of said groove thereby providing ferrous metal land areas alongside a porous metal band filling said groove.

3. The method of applying a porous wear resisting hard metal band to a ferrous metal piston ring which comprises forming a groove within the outer peripheral bearing face of the ferrous metal piston ring with outwardly opening curvilinear corner portions diverging all the way from the groove bottom to said bearing face of the ring and having radii of a length not less than the depth of the groove, spray depositing from a spray stream substantially transverse to the axis of the piston ring a metal selected from the group consisting of molybdenum and aluminum trioxide into direct impinging engagement with every surface of the groove, and effecting relative rotation between said spray stream and groove to effect an intimate bond of spray deposited metal with the ferrous metal and to fill the groove with porous metal about the entire ring.

4. The method of making porous wear resisting banded ferrous metal piston rings which comprises congruently stacking a plurality of split ferrous metal piston rings on an arbor with their split ends closed and their cylinder wall engaging surfaces lying in a common surface of revolution, clamping the thus stacked rings on the arbor, rotating the clamped assembly about the central longitudinal axis thereof, cutting cross-sectionally dish-like grooves in the peripheries of the rings of the rotating assembly with the side walls of each groove diverging all the way from the groove bottom to the periphery of the ring, spray depositing a metal selected from the group consisting of molybdenum and aluminum trioxide on the rotating assembly into direct impinging enegagement with every surface of each groove and with the entire periphery of each ring to effect an intimate bond with the ferrous metal and to fill the groves and cover the ring peripheries with said metal, grinding excess spray deposited metal from the periphery of the rotating assembly to a depth exposing the ring peripheries alongside of each groove thereby providing land areas alongside each porous metal filled groove and removing any porous metal connecting the adjacent piston rings, and releasing the rings from the arbor to provide finished porous metal banded piston rings.

5. The method of making piston rings which comprises stacking a plurality of metal piston rings on an arbor, clamping the stacked rings on the arbor with their cylinder wall engaging surfaces in a common surface of revolution, rotating the clamped assembly about the longitudinal axis thereof, pressing tool bits against the rotating periphery of the clamped assembly to cut a peripheral groove in each piston ring, controlling the tool bit cutting operation to form each peripheral groove with a side wall diverging all the way from the groove bottom to the peripheral surface of the ring, spray depositing a hard porous wear resisting high melting metal on the periphery of the rotating assembly into direct impinging engagement with every surface of each groove and the entire peripheral surface of each ring to effect an intimate bond with the ring and to cover the rotating assembly with sprayed metal, abrading the spray metal covered rotating assembly to a depth exposing the piston ring body metal adjacent each groove thereby removing any metal interconnecting the stacked rings and leaving each ring with a groove filled with the wear resisting metal, and thereafter removing the stacked rings from the arbor.

6. The method of making piston rings which comprises stacking a plurality of metal piston rings on an arbor, clamping the stacked rings on the arbor with their cylinder wall engaging surfaces in a common surface of revolution, rotating the clamped assembly about the longitudinal axis thereof, cutting grooves in the peripheries of the rings of the rotating assembly with the side walls of each groove diverging from the groove bottom to the periphery of the ring, spray depositing from a spray stream substantially transverse to the axis of the rotating assembly a hard porous metal wear resisting high melting metal on the periphery of the rotating assembly into direct impinging engagement with the entire peripheral surface of each ring and each groove surface in the ring to effect an intimate bond of spray deposited metal with the ring and to cover the rotating assembly with sprayed metal, removing spray deposited metal from the rotating assembly to a depth exposing the piston ring body metal adjacent each grove thereby removing any metal interconnecting the stacked rings and leaving each ring with a groove filled with the spray deposited wear resisting metal, and thereafter removing the stacked rings from the arbor.

References Cited in the file of this patent

UNITED STATES PATENTS

| 2,119,035 | Ballard | May 3, 1938 |
| 2,380,654 | Lane et al. | July 31, 1945 |
| 2,905,512 | Anderson | Sept. 22, 1959 |
| 3,041,194 | Rosen et al. | June 26, 1962 |